United States Patent [19]

van Rooij

[11] Patent Number: 4,628,746

[45] Date of Patent: Dec. 16, 1986

[54] DEVICE FOR DETERMINING THE TORQUE TRANSMITTED BETWEEN A SET OF CONICAL DISKS OF A CONTINUOUSLY VARIABLE TRANSMISSION AND THE SHAFT THEREOF

[75] Inventor: Jacobus H. M. van Rooij, Nuenen, Netherlands

[73] Assignee: Varicar B. V., Netherlands

[21] Appl. No.: 697,235

[22] Filed: Feb. 1, 1985

[30] Foreign Application Priority Data

Feb. 2, 1984 [NL] Netherlands .......................... 8400324

[51] Int. Cl.$^4$ ................................................ G01L 3/10
[52] U.S. Cl. .................................... 73/862.34; 474/17
[58] Field of Search ........... 73/862.32, 862.33, 862.34, 73/862.35, 862.36; 474/17, 18, 23

[56] References Cited

U.S. PATENT DOCUMENTS 3,085,427  4/1963  Martin .............................. 73/862.32

FOREIGN PATENT DOCUMENTS 0157861  9/1982  Japan .................................. 73/862.34
0028633  2/1983  Japan .................................. 73/862.31
1339319  12/1973  United Kingdom ............. 73/862.34

Primary Examiner—Charles A. Ruehl
Attorney, Agent, or Firm—Ostrolenk, Faber, Gerb & Soffen

[57] ABSTRACT

Device for determining the torque transmitted between a set of conical disks of a continuously variable transmission and the shaft thereof comprising an interconnecting element which is twistable over a restricted angle and interconnected between the set of conical disks on the one hand and the shaft on the other hand, and by two toothrings with radially outwardly directed teeth, coaxial with this element and connected to the respective ends thereof. Each tooth ring is enclosed by a complementary U-shaped stationary toothring provided with a winding the turns of which run in the circumferential direction.

2 Claims, 8 Drawing Figures

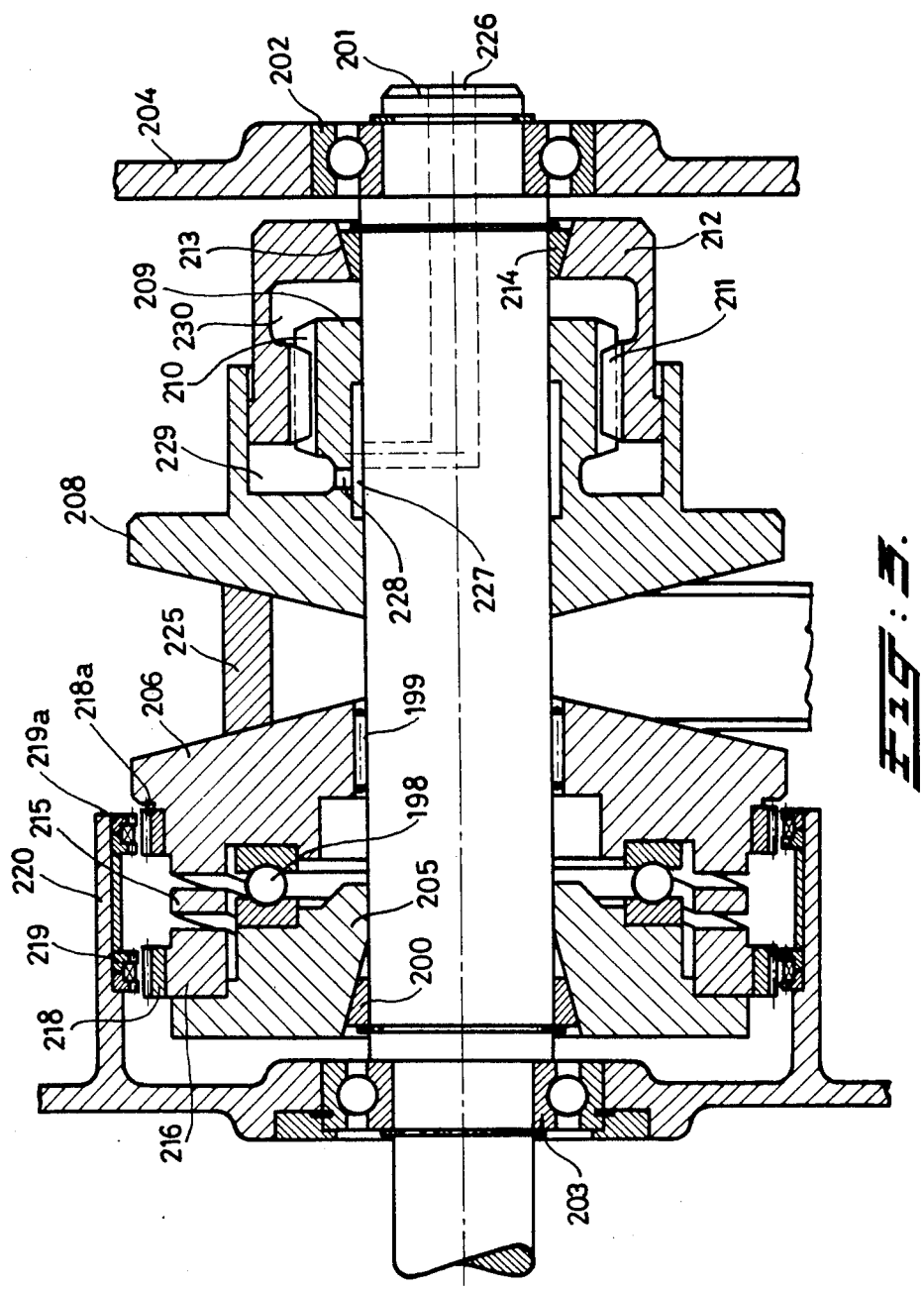

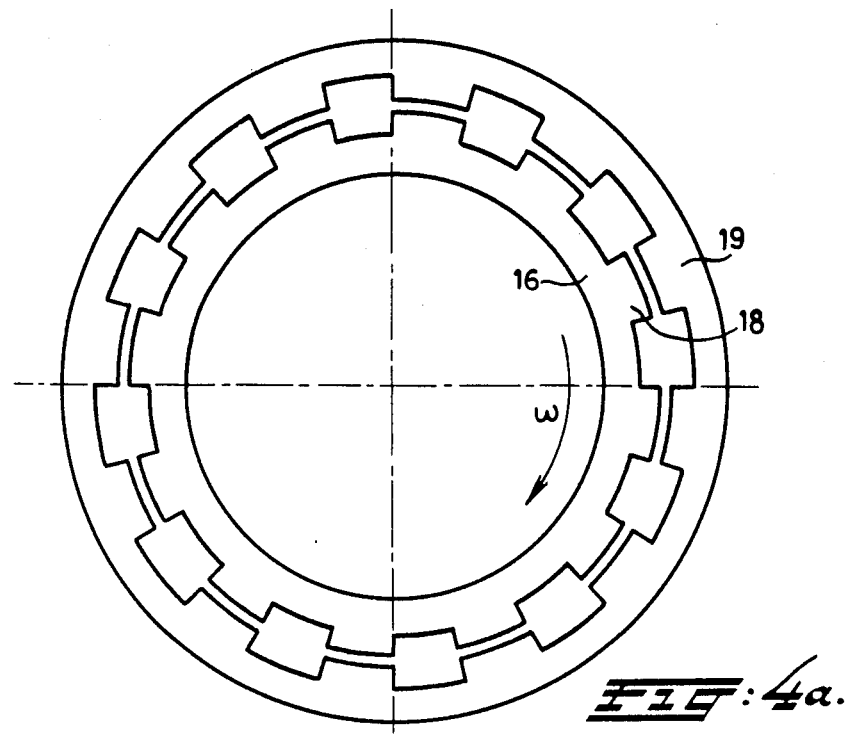
_FIG: 4a._
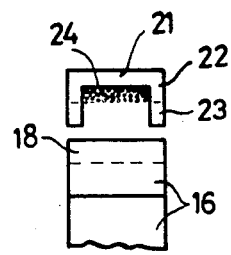
_FIG: 4b._
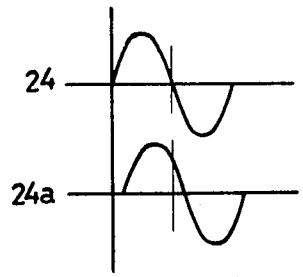
_FIG: 5a._
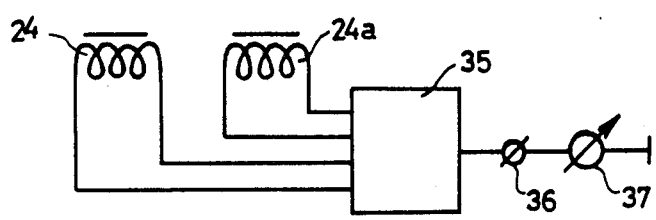
_FIG: 5._

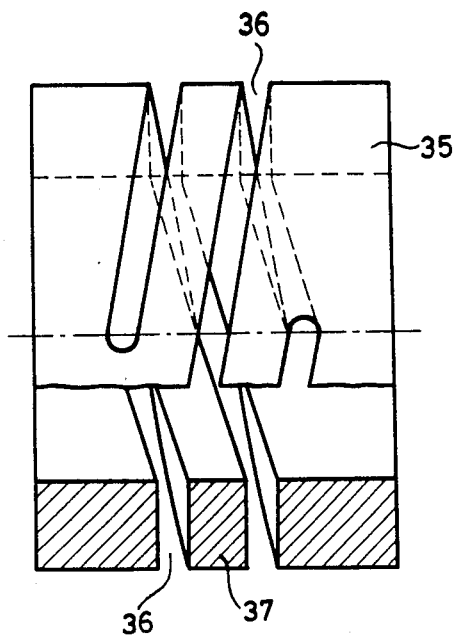
FIG: 6.

DEVICE FOR DETERMINING THE TORQUE TRANSMITTED BETWEEN A SET OF CONICAL DISKS OF A CONTINUOUSLY VARIABLE TRANSMISSION AND THE SHAFT THEREOF

BACKGROUND OF THE INVENTION

This invention relates to a device for determining the torque transmitted between a set of conical disks of a continuously variable transmission and the shaft thereof.

In many cases it is desirable to know the torque transmitted during operation of a continuously variable transmission between a set of conical disks and the shaft thereof. When, for instance, both the ingoing torque and the outgoing torque are known, the efficiency of the transmission can be measured in a very simple way and data can be obtained about the operation and the operating circumstances of the transmission.

When a continuously variable transmission is used in combination with a flywheel drive measuring the torque is necessary for the control of the transmission as a flywheel contains so much energy that a change of the transmission ratio which is effected too fast leads to damage and accidents. As the torque is a measure for the loading of the driving motor a signal representing said torque can be used as a control signal in, for instance, an electronic fuel injection system or to control the ignition timing.

It is possible to use a known torque measuring device in a test stand for one or both shafts. Thus a strain gauge may be used which is not possible in a normal transmission included in a vehicle and used normally. So there exists the need of a torque measuring device for a continuously variable transmission which takes up but little space, can be included permanently into the transmission and which during operation continuously delivers a measuring signal representing the torque transmitted between the set of disks and the shaft thereof.

SUMMARY OF THE INVENTION

The invention provides such a device. According to the invention this device comprises an interconnecting element which is twistable over a restricted angle and interconnected between the set of conical disks on the one hand and the shaft on the other hand, and by two tooth rings with radially outwardly directed teeth, coaxial with this element and connected to the respective ends thereof. Each tooth ring is enclosed by a complementary, U-shaped stationary tooth ring provided with a winding the turns of which run in the circumferential direction.

Preferably the interconnecting element consists of a cylindrical bushing provided with circumferential incisions.

During operation the interconnecting element will twist more or less, dependent upon the transmitted torque so that the mutual position of the outwardly directed teeth with respect to the opposite, stationary, teeth will change and a phase shift will occur between the respective measuring signals supplied by the respective windings. This phase shift is a measure for the transmitted torque.

Such a device is insensitive for high temperatures and resistant for the lubricating materials used in the transmission.

The structural integration of this device within a continuously variable transmission is possible in several ways. So the interconnecting element can be provided between a first conical disk, which carries the first tooth ring and is rotatable but axially non-shiftable with respect to the shaft and on the other hand a flange, which is fixed to the shaft and also carries a tooth ring toothring. When the axially shiftable second conical disk is rotatably carried by a bearing bushing connected to the first disk and enclosing the shaft and coupled to a driver permitting an axial movement of the second disk.

Preferably the structure is such that the second conical disk carries a cylinder coaxial with the bearing bushing, of which the inner surface sealingly cooperates with the outer surface of a cylindrical part of the driver. Said driver is coaxial with the bearing bushing and is provided with driving elements cooperating with the conical disk and with an end flange having a central opening with tapering surface fitting on a carrier ring with tapering outer surface and locked on the bearing bushing, such that during operation pressure medium is supplied to the chamber between the second conical disk and the front surface of the driver.

This has the advantage that the interconnection between the various parts is maintained by the operating pressure, using simple structural parts.

A simple embodiment is obtained when the axially shiftable second conical disk is non-rotatably coupled to the shaft by means of a driver fixed to said shaft. Here, however the output represents half the transmitted torque.

An embodiment is possible in which the second conical disk carries a cylinder coaxial with the shaft to and the inner surface of the cylinder sealingly cooperates with the outer circumference of the shaft. The bearing bushing is coaxial with the cylindrical part of the driver. The driver is provided with driving elements cooperating with the conical disk and with an end flange having a central opening with tapering surface fitting to a carrying ring with tapering outer surface which is locked to the shaft. During operation pressure medium is supplied to the chamber between the second conical disk and the front wall of the driver.

Another embodiment is such that the first conical disk is fixedly connected to a bearing bushing which is rotatable but not shiftable with regard to the shaft, said bearing bushing carrying the shiftable second conical disk which through a driver is coupled to a first flange fixed to the bearing bushing, the flange carrying a first tooth ring and is coupled, through the interconnecting element, to a flange fixed to the shaft and carrying the second tooth ring. Preferably this embodiment is such that the second conical disk carries a cylinder. The inner surface of said cylinder cooperates sealingly with the outer circumference of a cylinder of the driver coaxial with the bearing bushing, said driver being provided with driving elements cooperating with the conical disk. The first flange is provided with a central opening with tapering surface fitting to a carrying ring with tapering outer surface locked to the bearing bushing. During operation pressure medium is supplied to the chamber between the second conical disk and the front wall of the driver.

BRIEF DESCRIPTION

FIG. 3 is a longitudinal section through a third embodiment according to the invention;

FIG. 4a is an end-view of the tooth rings of the present invention the invention;

FIG. 4b is a section through the line IVa—IVa in FIG. 4a;

FIG. 5 gives the circuit for evaluating the measuring signals;

FIG. 5a is a diagrammatic showing of the phase angle shaft in the drive system.

FIG. 6 is a section through the connecting element the invention.

DESCRIPTION OF THE PREFERRED EMBODIMENTS

Figure 1:
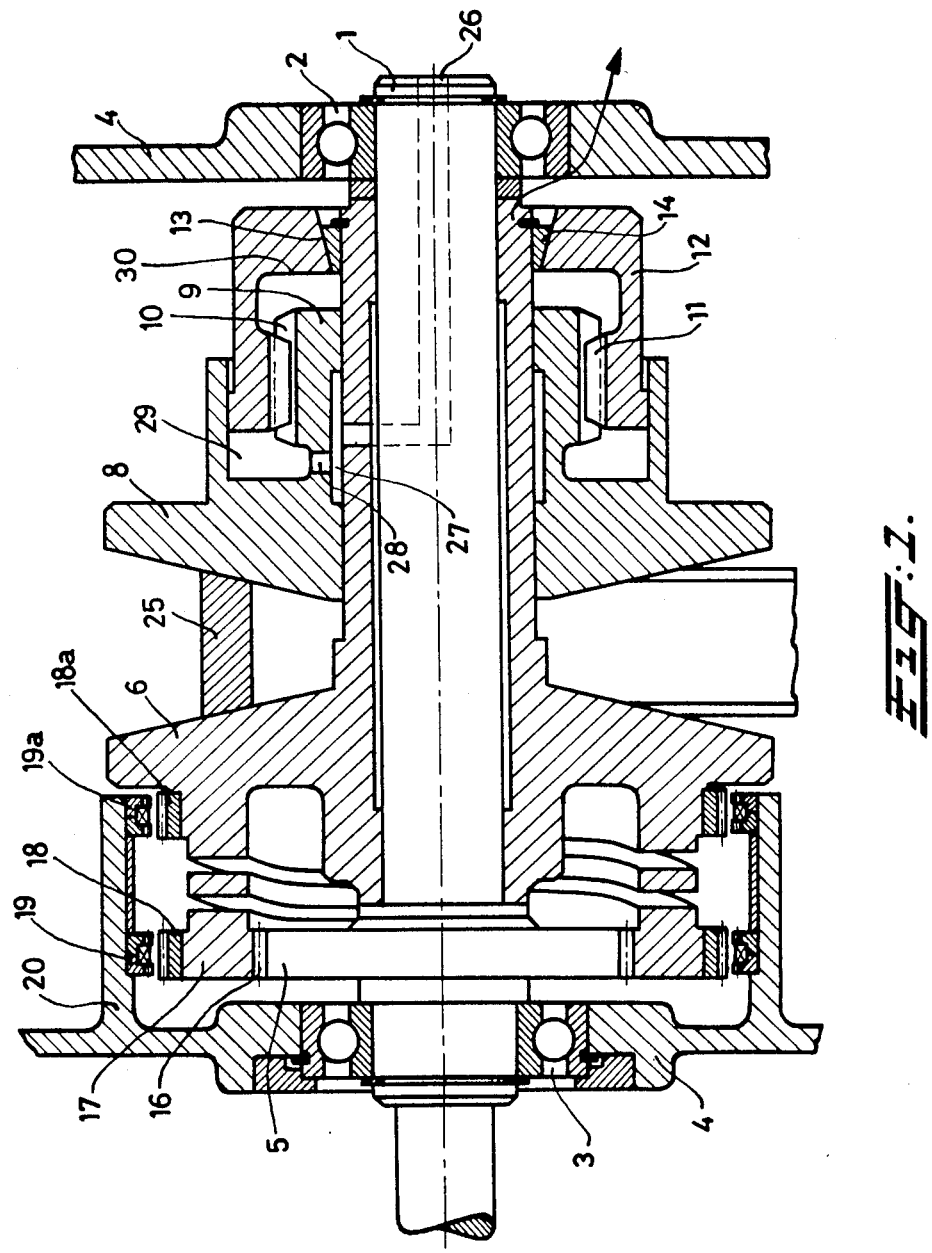
FIG. 1 is a longitudinal section through a first embodiment according to the invention.

FIG. 1 shows an embodiment in which the total torque transmitted by the two conical disks of one half of a continuously variable transmission to the shaft thereof can be determined. The shaft 1 of the transmission-half is supported by means of roller bearings 2, 3 in the housing 4. To the shaft 1 is fixed the flange 5 and, rotatable but not shiftable with regard to the shaft, the conical pulley disk 6 which continues into a bearing bushing 7 which carries the second pulley disk 8, the position of which can be adjusted in axial direction. This conical pulley disk 8 is connected to a bushing 9 having radially outwardly directed teeth 10 cooperating with radially inwardly directing teeth 11 on the driver 12. Axial movement of driver 12 is prevented by the combination of the conical abutment surface 13 and the conical pressure ring 14 fixed to the shaft 1.

Between the flange 5 and the conical disk 6 is the twistable interconnecting element 17 which, as the figure shows is shaped as a bushing with circumferential incisions. The righthand end of this bushing is solid with the conical disk 6 and the lefthand end thereof is fixed at 16 to the flange 5.

The circumferential incisions are helical. In the embodiment shown there are two incisions which together constitute a double screw; FIG. 6 shows this in more detail. The starting points of the incisions lie in one plane but are shifted over an angle of 180°; the incisions cover an angle of 360° and have mutually equal pitch. The material which remains between the two incisions constitutes the twistable element.

The element 17 carries outer teeth 18 as shown in FIG. 4a and which cooperate with a tooth ring 19, also shown in FIG. 4a, fixed to the flange 20 of the housing 4. The tooth ring 19 is in cross section U-shaped with a bottom 21 and protruding legs 22 in which the teeth 23 are formed; within the space enclosed by the legs 22 is provided a winding 24. The turns thereof are, as FIG. 4b shows, directed in the circumferential direction.

The conical disk 6 also carries a tooth ring, 18a cooperating with the outer tooth ring 19a; shape and dimension of the tooth rings 18 and 19 on the one hand and 18a, 19a on the other hand are equal.

During operation torque is transmitted by the driving belt 25 to the conical disks 6 and 8; the position of the disks 6 and 8 is determined by the value of the pressure built up in the chamber 29 between the disk 8 and the driver 12 through the bore 26, space 27 and the channel 28; this pressure also acts upon the surface 30 of the driver 12 so that the driver is pressed against the abutment surface 13 and cannot rotate with respect to the bearing bushing 7.

As the conical disk 8 is coupled to the bearing bushing 7 and to the disk 6 the total torque, transmitted by the half of the transmission, is transmitted through the interconnecting element 17 to the flange 5 and from there to the shaft 1. During operation this results in a twisting over a certain angle of the interconnecting element 17 so that the mutual angular position of the tooth rings 18 and 19 will differ from the situation shown in FIG. 4a. The result is that the alternating voltages induced into the windings 24 and 24a, of which the frequency is determined by the rotational speed of the tooth rings, shows a phase difference (see FIG. 5a) and said phase difference is a measure of the torque transmitted by the CVT-half. By means of a circuit 35 which is known in itself this phase difference is converted into a signal at the output 36 thereof which is a measure of the transmitted torque and which can, for instance, be indicated with a measuring instrument 37.

Figure 2:
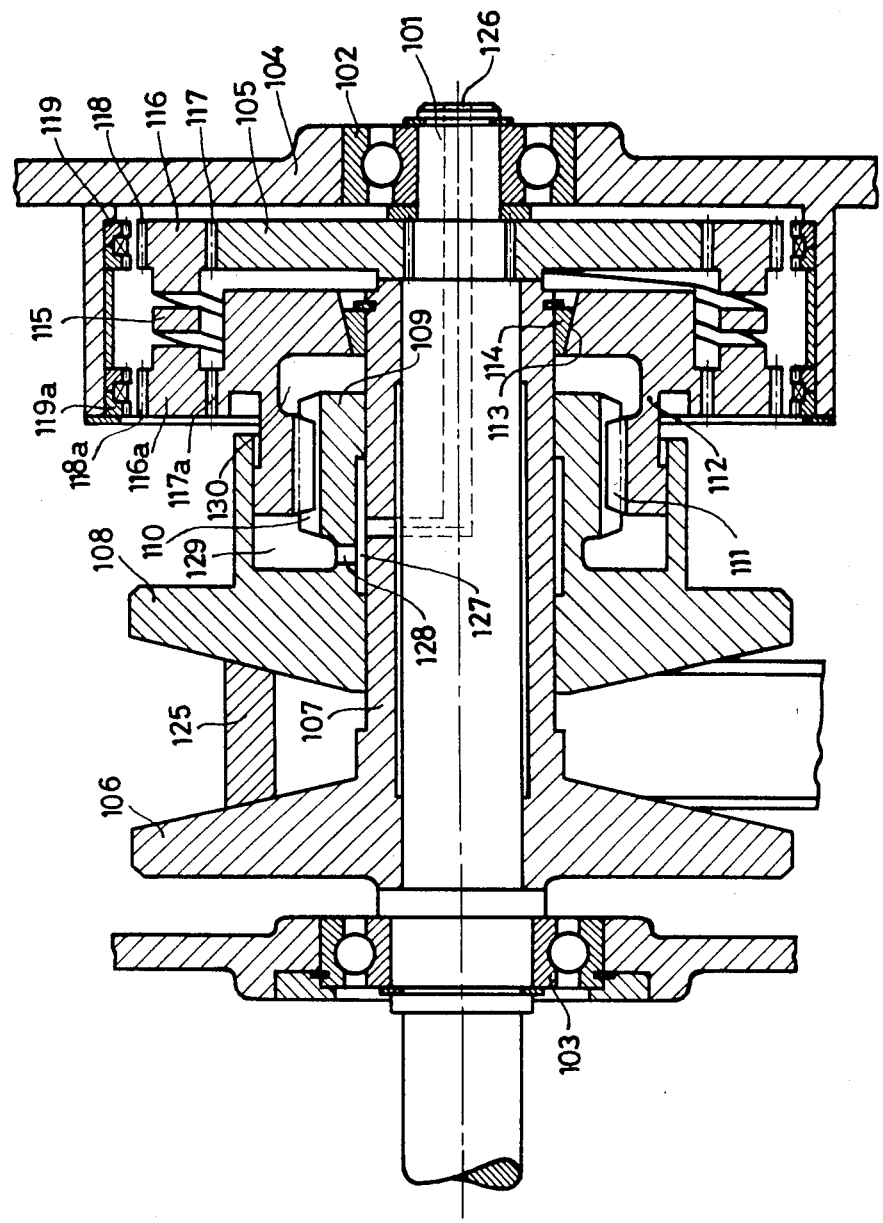
FIG. 2 is a longitudinal section through a second embodiment according to the invention.

The embodiment according to FIG. 2 corresponds in principle to the one according to FIG. 1; the difference is that the twistable interconnecting element is here provided at the end of the axially movable conical disk. In this embodiment, too, the total torque, transmitted by the CVT-half is measured. The shaft 101 is carried by the bearings 102, 103 respectively in the housing 104; at the righthand end the shaft carries the flange 105 fixed thereto and at the other hand the rotatable but not shiftable conical disk 106 having a bearing bushing 107 on which is provided, shiftable in axial direction, the conical disk 108. This disk is provided with the bushing 109 carrying the radially outwardly directed teeth 110 cooperating with the radially inwardly directed teeth 111 of the carrier 112 which through the abutment surface 113 is pressed to the conical ring 114. The twistable interconnecting element 115 is present between the ring 116 which is, at 117, fixed to the flange 105 and the ring 116a which is, at 117a, fixed to the carrier 112. The ring 116 is provided with teeth 118 cooperating with the outer tooth ring 119 while the ring 116a is provided with teeth 118a cooperating with the outer tooth ring 119a. The operation corresponds to the embodiment according to FIG. 1: pressure medium is supplied through the channel 126, the space 127 and the channel 128 to the chamber 129 and the chamber 130; thus the position of the conical disks 106 and 108 respectively, between which lies the driving belt 128, and therewith the transmission ratio, is set. As the disks 106 and 108 are non-rotatably coupled to each other the entire torque is transmitted through the twistable interconnecting element 115 and determined from the difference in angular position between the tooth rings 118 and 118a.

FIG. 3 shows an embodiment which is more simple than the preceding embodiments but which, however, only measures half the torque transmitted to a conical disk which is shiftable but non-rotatable coupled to the shaft. In this embodiment the shaft 201 is supported in the housing 204 by the bearings 202, 203; the shaft carries the flange 205 through a conical pressure ring 200 and, through the needle bearing 199, the conical disk 208 which cannot shift in axial direction. The adjustable and shiftable disk 208 is solid with the bushing 209 having teeth 210 cooperating with the teeth 211 of a driver 212 which through the abutment surface 213 is connected to the conical ring 214. Between the flange 205 and the disk 206 is the axial bearing 198 and the twistable interconnecting element 215 of which the ring 216 is connected to the flange 205. The conical disk 206 carries a tooth ring 218a cooperating with the tooth ring 219a and the ring 216 carries the tooth ring 218 cooperating with the tooth ring 219. The tooth rings 219, 219a are carried by the flange 220 of the housing 204.

Pressure medium is supplied through the channel 226, the space 227 and the channel 228 to the chamber 229 and the chamber 230. During operation the driving belt 225 is clamped between the disks 206 and 208; the pressure exerted by the pressure medium has as a result that on the one hand the carrier 212 is via the conical ring 214 clamped to the shaft while on the other hand the flange 205 through the conical ring 200 is also clamped to the shaft.

Of the total torque, transmitted by the driving belt 225, one half is directly transmitted through the conical disk 208 and the carrier 212 to the shaft 201; the other half is transmitted through the conical disk 206, the interconnecting element 215 and the flange 205 to the shaft. This part of the total torque is measured as described hereinbefore.

A small drawback of this embodiment is that during operation the angular position of the conical disks 206 and 208 will be somewhat different.

FIG. 6 shows in detail the twistable interconnecting element having a cylindrical part 35 in which incisions 36 are made, leaving free the in between parts 37. This configuration has the advantage that the twisting is a linear function of the transmitted torque.

What is claimed is:

1. Continuously variable transmission, comprising:
   a shaft (201) carrying, by means of a roller bearing (199), a first conical disc (206) and a second conical disc (208), coupled to said shaft so as to be non-rotatable but movable in axial direction with respect to said shaft,
   said first disc (206) being provided at its outer circumference with a first tooth ring (218a),
   and being connected to one end of a cylindrical torsion element (215) with circumferential incisions, the other end of said element being connected to a flange (205) fixed on said shaft (201),
   a thrust roller bearing (198) interposed between said first conical disc (206) and said flange (205),
   said flange carrying on its outer circumference a second tooth ring (218),
   said first (218a) and second (218) tooth ring each being enclosed by an opposite first (219a) and a second (219) stationary tooth ring respectively with U-shaped cross-section and provided with an electrical winding (24) of which the turns run in circumferential direction, said windings to be connected to an electrical circuit (35) for measuring the phase difference of the signals generated therein to obtain an output signal representing the twist of said cylindrical torsion element and thereby the torque transmitted by it.

2. Continuously variable transmission according to claim 1, characterised in that the second conical disc (208) carries a cylinder part coaxial with the shaft (201) of which the inner surface sealing cooperates with the outer circumference of a driver (212) fixed to said shaft (201) and provided with driving elements (211) cooperating with the conical disc (208) and with an end flange having a central opening with tapering surface (213) fitting to a carrying ring (214) with tapering outer surface which is locked to the shaft (201), while during operation pressure medium is supplied to the chamber (229) between the second conical disc and the front wall of the driver.

* * * * *